US008415553B2

(12) United States Patent
Skrabin et al.

(10) Patent No.: US 8,415,553 B2
(45) Date of Patent: Apr. 9, 2013

(54) PHOTOELECTROCHEMICAL PHOTOVOLTAIC PANEL AND METHOD TO MANUFACTURE THEREOF

(75) Inventors: Igor Lvovich Skrabin, Yarralumla (AU); George Phani, Illawong (AU); Gavin Edmund Tulloch, Burra Creek (AU); Michael Peter John Bertoz, Flynn (AU); Graeme Leslie Evans, Kambah (AU)

(73) Assignee: Dyesol, Ltd., Queanbeyan (AU)

( * ) Notice: Subject to any disclaimer, the term of this patent is extended or adjusted under 35 U.S.C. 154(b) by 0 days.

(21) Appl. No.: 11/659,766

(22) PCT Filed: Aug. 11, 2005

(86) PCT No.: PCT/AU2005/001194
§ 371 (c)(1),
(2), (4) Date: Apr. 30, 2008

(87) PCT Pub. No.: WO2006/015431
PCT Pub. Date: Feb. 16, 2006

(65) Prior Publication Data
US 2008/0295880 A1    Dec. 4, 2008

(30) Foreign Application Priority Data
Aug. 11, 2004  (AU) .................... 2004904501

(51) Int. Cl.
*H02N 6/00* (2006.01)
*H01L 31/042* (2006.01)
(52) U.S. Cl. ........................ 136/244; 136/251
(58) Field of Classification Search ............. 136/244, 136/251
See application file for complete search history.

(56) References Cited

U.S. PATENT DOCUMENTS

| | | | | |
|---|---|---|---|---|
| 4,517,403 A | * | 5/1985 | Morel et al. | 136/249 |
| 4,540,843 A | * | 9/1985 | Gochermann et al. | 136/251 |
| 4,633,032 A | * | 12/1986 | Oido et al. | 136/251 |
| 4,927,721 A | | 5/1990 | Gratzel et al. | |
| 5,350,644 A | | 9/1994 | Graetzel et al. | |
| 5,501,744 A | * | 3/1996 | Albright et al. | 136/258 |
| 5,525,440 A | | 6/1996 | Kay et al. | |
| 5,728,487 A | | 3/1998 | Gratzel et al. | |

(Continued)

FOREIGN PATENT DOCUMENTS

| | | |
|---|---|---|
| DE | 4412050 | 1/1995 |
| DE | 4416247 | 11/1995 |

(Continued)

OTHER PUBLICATIONS

Leppanen, J., "Manufacturing options for large A-Si Pv facade elements," Engineering Conference, Vienna, Austria, Jul. 6-10, 1998, vol. 3, Jul. 6, 1998, pp. 2575-2578.*

(Continued)

*Primary Examiner* — Jonathan Johnson
*Assistant Examiner* — Allison Bourke
(74) *Attorney, Agent, or Firm* — Davis & Bujold, PLLC

(57) ABSTRACT

A Photoelectrochemical Photovoltaic Panel (PPP) comprising a number of individual substrates (1) and shared substrates (2), wherein: the substrates are electrical conductors or at least partially coated by an electrical conductor (3); at least one substrate is optically transparent; between the shared substrate (2) and the individual substrates (1) there are Photoelectrochemical Photovoltaic Cells, each comprising a photosensitive electrode, a counter electrode and an electrolyte.

25 Claims, 6 Drawing Sheets

U.S. PATENT DOCUMENTS

| | | | |
|---|---|---|---|
| 6,069,313 A * | 5/2000 | Kay | 136/249 |
| 6,297,900 B1 | 10/2001 | Tulloch et al. | |
| 6,462,266 B1 * | 10/2002 | Kurth | 136/251 |
| 6,555,741 B1 | 4/2003 | Hopkins et al. | |
| 6,664,623 B1 | 12/2003 | Phani et al. | |
| 6,706,963 B2 * | 3/2004 | Gaudiana et al. | 136/263 |
| 2003/0056821 A1 | 3/2003 | Chittibabu et al. | |
| 2003/0205268 A1 * | 11/2003 | Nakamura et al. | 136/250 |

FOREIGN PATENT DOCUMENTS

| | | |
|---|---|---|
| DE | 19640616 | 4/1998 |
| JP | 11273753 | 10/1999 |
| JP | 2003-068373 | 3/2003 |
| JP | 2004171827 | 6/2004 |
| WO | WO 98/05084 | 2/1998 |
| WO | WO 98/24100 | 6/1998 |

OTHER PUBLICATIONS

Defintion of Substratum from dictionary.com, <http://dictionary.reference.com/browse/substratum>, accessed Nov. 24, 2010.*

Solatron Technologies, "Wiring solar modules and batteries", <http://www.partsonsale.com/learnwiring.htm>, webarchived 2003 at <http://web.archive.org/web/20030206212224/http://www.partsonsale.com/learnwiring.htm>.*

* cited by examiner

PHOTOELECTROCHEMICAL PHOTOVOLTAIC PANEL AND METHOD TO MANUFACTURE THEREOF

This application is a national stage completion of PCT/AU2005/001194 filed Aug. 11, 2005 which claims priority from Australian Application Serial No. 2004904501 filed Aug. 11, 2004.

TECHNICAL FIELD

This invention relates to photoelectrochemical photovoltaic cells (PPC). More particularly, the invention relates to photoelectrochemical photovoltaic modules of large size (both flexible and rigid) that include plurality of the PEC integrated in one photovoltaic source.
Examples of the PEC are disclosed in the following patent specifications:
U.S. Pat. No. 4,927,721, Photoelectrochemical cell; Michael Graetzel and Paul Liska, 1990.
U.S. Pat. No. 5,350,644, Photovoltaic cells; Michael Graetzel, Mohammad K Nazeeruddin and Brian O'Regan, 1994.
U.S. Pat. No. 5,525,440, Method of manufacture of photoelectrochemical cell and a cell made by this method; Andreas Kay, Michael Graetzel and Brian O'Regan, 1996.
U.S. Pat. No. 5,728,487, Photoelectrochemical cell and electrolyte for this cell; Michael Graetzel, Yordan Athanassov and Pierre Bonhote, 1998.
WO 98/05084, Photoelectrochemical cell, S. Brodie et all.
U.S. Pat. No. 6,297,900—Electrophotochromic Smart Windows and Methods, Gavin Tulloch and Igor Skryabin, 2000.
U.S. Pat. No. 6,555,741—Methods to Implement Interconnects in Multi-cell Regenerative Photovoltaic Photoelectrochemical Devices, G. Phani, I. Skryabin and J. Hopkins, 2001
U.S. Pat. No. 6,664,623—Methods to Implement Sealing and Electrical Connections to Single Cell and Multi-cell Regenerative Photovoltaic Photoelectrochemical Devices, G. Phani, J. Hopkins, D. Vittorio, I. Skryabin, 2002

BACKGROUND OF THE INVENTION

Photoelectrochemical Photovoltaic Cells (PPC), as of the type disclosed in the above patents, are typically fabricated in a laminate arrangement between two substrates. In a typical arrangement, at least one substrate is transparent to visible light and comprises a transparent support (typically glass for rigid modules and plastic—for flexible modules) to which a transparent electrically conductive (TEC) coatings is applied. Another substrate is not necessarily transparent to visible light. Various materials suitable for non-transparent substrate are described in the prior art, including:
  Thin metallic films supported by glass, ceramic or polymer,
  Metallic foils,
  Metallic mesh,
  Carbon based conductors.
However, the TEC coatings, which usually comprise a metal oxide(s), have high resistivity when compared with normal metal conductors, resulting in high resistive losses for large area cells. Thus, in practical application, these cells are combined in modules.
Dimensions of the modules are limited, however, by necessity to maintain uniform thickness of a module (typically 20-50 micrometers). In order to make a large photovoltaic photoelectrochemical panel (PPP) the modules are electrically connected and laminated between two additional large panes, one of which is being transparent. (see, for example, Australian design No 2093/2002). Manufacture of such panels, however, requires additional manufacturing equipment and procedures.

OBJECTIVE OF THE INVENTION

Objective of this invention is to provide cost effective large size photovoltaic photoelectrochemical panel.

SUMMARY OF THE INVENTION

Generally the present invention provides for a Photoelectrochemical Photovoltaic Panel (PPP) comprising one shared substrate and a number of individual substrates. The shared substrate is an electrical conductor or is at least partially coated by an electrically conducting material. Similarly, individual substrates are all electrical conductors or at least partially coated with an electrically conducting material.
In one embodiment the shared substrate is transparent to at least a part of solar radiation.
In another embodiment at the individuals substrates are all transparent to at least a part of solar radiation.
In further embodiment the individual substrates and the shared substrate (hereafter—the substrates) are all transparent to at least a part of solar radiation.
In yet a further embodiment said electrically conducting material is a transparent electronic conductor (TEC), for example fluorine doped tin oxide or indium-tin oxide.
Photoelectrochemical photovoltaic cells (PPC) are formed between the shared substrate and the individual substrates. Each PPC includes a photosensitive electrode, a counter electrode and an electrolyte dispensed between the photosensitive electrode and the counter electrode. The photosensitive electrode typically comprises nano-particulate wide band semiconductor (for example—titanium dioxide), photosensitised by a thin layer of dye.
In one embodiment the photosensitive electrodes of the PPC are supported by the shared substrate whereas the counter electrodes of the PPC—by the individual substrates.
In another embodiment only some of the photosensitive electrodes are supported by the shared substrate and the remaining photosensitive electrodes are supported by the individual substrates.
In the practical realisation of the invention the shared substrate is substantially larger than each of the individual substrates allowing for a significant number of PPC to be formed in one panel. Although the invention has no specific restrictions on the shape of the shared substrate, rectangular shape is advantageous for the purpose of use and manufacture, especially—for roll-to-roll manufacture, which is preferable when the shared substrate and all the individual substrates are made of flexible material.
In one aspect of the invention, the shared substrate is divided into electrically isolated regions; each region opposes at least one adjacent individual substrate and the PPC are formed between the individual substrate and the opposing isolated region of the shared substrate.
In one embodiment in accordance with this aspect of the invention at least one of the substrates is made of glass coated by Transparent Electronic Conductor (TEC).
In another embodiment in accordance with this aspect of the invention, at least one of the substrates is made of polymeric material coated by TEC.
In still another embodiment, at least one of the substrates is made of metal or metal alloy. Preferential metals include titanium, tungsten, nickel, zinc or alloys such as stainless steel.

In yet another embodiment at least one of the substrates is made of metal coated by impermeable nitride (e.g. TiN).

In a further embodiment, at least one of the substrates comprises metal foil or metallic mesh.

In still a further embodiment, at least one of the substrates comprises polymeric sheet coated by metal or laminated with metallic foil.

In yet a further embodiment the shared substrate comprise polymeric material coated by TEC and all the individual substrates comprise metal foil.

In the preferred embodiment the shared substrate is made of polymeric material coated by TEC and all the individual substrates comprise metallic foil, wherein said photosensitive electrodes of said PPC are formed on the individual substrates and counter electrodes—on the shared substrate.

The invention provides for various shapes and dimensions of the individual substrates, it is preferential, however, to utilise the individual substrates (and PPC electrodes) of circular shape in order to minimise resistive losses. Another advantage of the circular shape is in minimisation of perimeter for a given area of the PPC electrodes, since each of the PPC needs to be sealed along the perimeter of the individual substrate. Dimensions of each PPC depend on the type of conductor. Dimensions of the individual substrate depend on resistivity of selected TEC material. It has been established that for full sun operations diameter of each PPC must not exceed 10-15 mm if resistivity of the TEC material is around 10 Ohms/square.

In the preferred embodiment the individual substrates are electrically connected to selected electrically isolated regions of the common substrate. This allows for electrical connections between the PPC to form two terminal power source of the PPP. It is advantageous to connect the PPC in such a way that both negative and positive terminals of the power source are located on the shared substrate.

In another aspect of the invention a pattern of a second electrically conductive material is created on at least one substrate. This material is selected to have conductivity higher than that of the first electrically conductive material. The second electrically conductive material enhances conductivity of the substrate without significant reduction of its optical transparency. Examples of the secondary conductive material include metal (for example, Ag, Cu, Au) tracks deposited on the substrate using screen-printing, vacuum mask deposition, electroplating, etc.

In one embodiment, the electrically conductive material is protected by an impermeable protective layer of glazing or polymeric material. This protection is especially important when said electrically conductive material is exposed to said electrolyte of PPC.

In another embodiment the pattern of the second electrically conductive material is created by varying the thickness of the first conducting material in such a way that regions of the substrate where high optical transmittance is required (under or opposite the photosensitive electrodes) are coated by the relatively thin TEC (the first electrically conductive material), whereas other regions of the substrates, where high electrical conductance is required, are coated by a thick electrically conductive material or (the second electrically conductive material).

According to another aspect of the invention, small holes are prepared either in the shared substrates or in the common substrate. The holes are used for filling the cells with said electrolyte. The holes are further sealed with a polymeric material, preferably by the laminate that comprises a hot melt polymeric material and a metal foil.

From yet a further aspect of the invention, at least one isolated region of the shared substrate is further subdivided into electrically isolated subregions and the opposing individual substrate is also divided into electrically isolated subregions, with each said PPC being formed between parts of two opposing subregions (one on the shared substrate and another on the indvidual substrate) and said adjacent PPC are electrically interconnected in series by an interconnecting material. To enable connections of cells in series, the interconnecting material is placed between a separate part of the sub region adjacent to the photosensitive electrode of n-th said PPC and a separate part of the sub region adjacent to said counterlectrode of (n+1)-th PPC.

In one embodiment the interconnecting material comprises metallic particles, and/or graphite flakes.

In another embodiment the said interconnecting material comprises metal wire, wire braid or wire plait.

In yet another embodiment the said electrically interconnecting material comprises metallic mesh.

In a further embodiment electrically conducting components of the interconnecting material are protected from electrolyte of PPC by impermeable electrically insulating material, preferably—polymeric material, in which said conducting components are embedded.

In the preferred embodiment said polymeric material is hot melt material.

In one process the insulating hot melt material is melted and adhered to both substrates due to the heat generated in metallic interconnecting material. The invention provides for passing electrical current through the interconnecting material in order to generate heat sufficient for melting and adhesion of the hot melt material. In preferred process the heat is generated by an inductive action of an electromagnetic field.

Specific attention is given to the spaces that formed between the individual substrates when they attached to the common substrate.

In one embodiment these spaces are filled with an hermetic sealant.

In another embodiment humidity absorbing material (e.g.—molecular sieves) is placed in these spaces; to ensure long term stability of the photoelectrochemical devices.

In yet another embodiment these spaces are fully or partially filled with a solvent of the same chemical nature as that used for an electrolyte in the photoelectrochemical cells. This is to minimise long term degradation effects caused by the loss of solvent in the cells.

BRIEF DESCRIPTION OF DRAWINGS

Having broadly portrayed the nature of the present invention, embodiments thereof will now be described by way of example and illustration only. In the following description, reference will be made to the accompanying drawings in which.

DETAILED DESCRIPTION OF DRAWINGS

Figure 1:
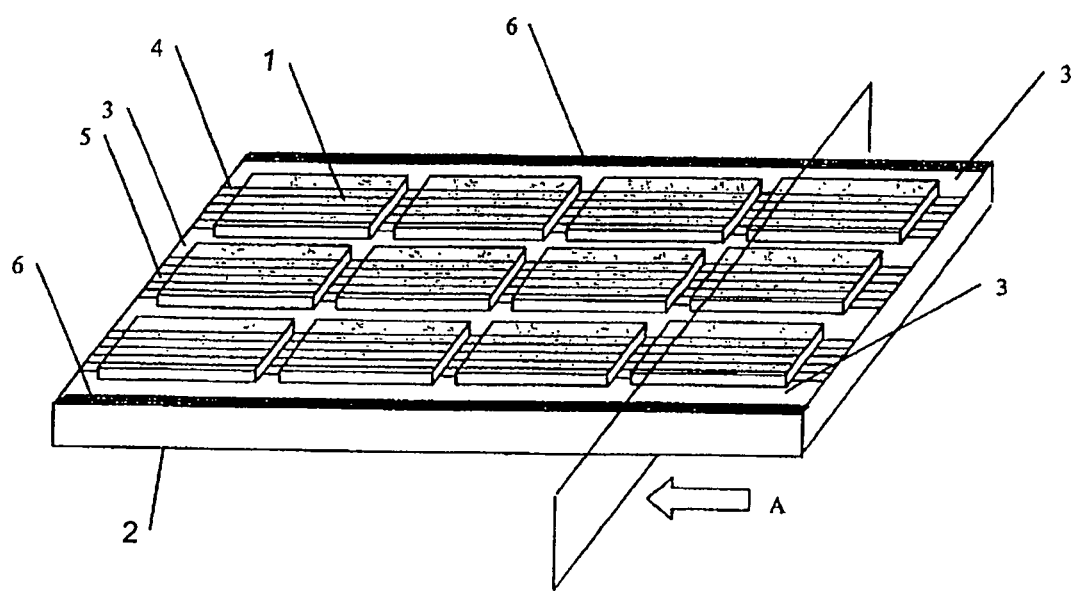
FIG. 1 is a 3D diagrammatic representation of a PPP formed in accordance with the first example of the invention.

With reference to FIG. 1, a 3D diagrammatic representation of a PPP is shown. The panel comprises twelve individual substrates 1 and a shared substrate 2. The substrates are coated by TEC (fluorine doped tin oxide) layer 3. The electrically isolated regions of the transparent electrical conductor 3n are formed by removing said conductor along the isolation lines 4. This procedure utilizes laser radiation and can be applied to all the substrates; 3D representation in FIG. 1 allows visualization of these lines only on the shared substrate. The PPC are formed between parts of the isolated regions 5 of the common substrate and opposing isolated regions of the isolated substrate. The PPC are interconnected to form 2 terminal power output of the PPP. The terminals are created by depositing AG bus-bars 6. Also shown a plane A, cross-sectional representation in which is shown in FIG. 2.

Figure 2:
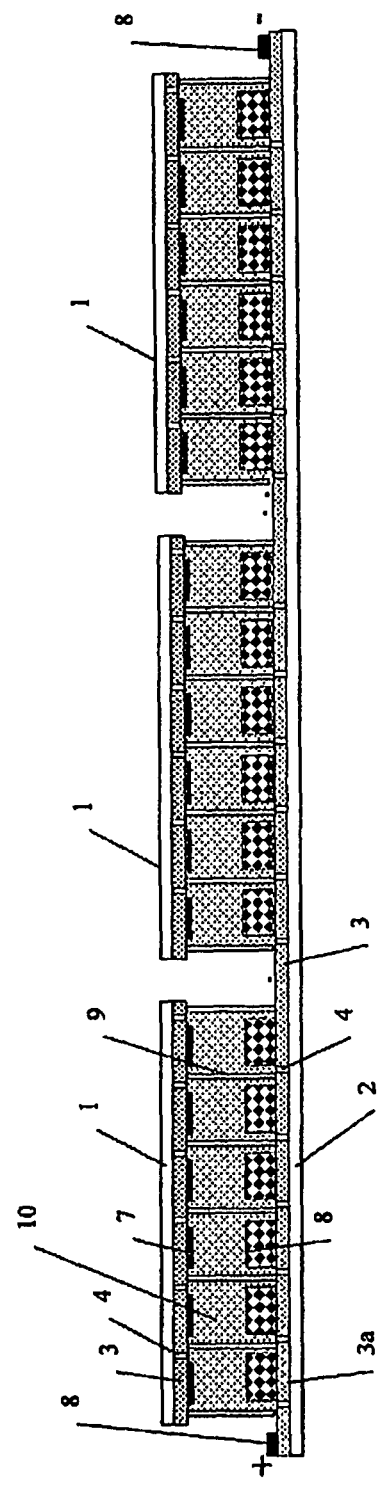
FIG. 2 is an enlarged partial cross-section of a Photoelectrochemical Photovoltaic Panel formed in accordance with the first example of the invention.

With reference to FIG. 2, cross section that includes three individual glass substrates is shown. The shared substrate 2 (also—glass) and the individual substrates 1 are coated by TEC layer 3. The electrically isolated regions are formed by removing TEC material along the lines 4. Counter electrodes 7 (ultra-thin layer of Pt based catalyst) is formed on parts of the electrically isolated regions of the individual substrates 1, using standard screen-printing technique. Photosensitized electrodes 8 are formed on parts of the isolated regions 3a of the shared substrate 2. The photosensitized electrodes 8 comprise nano-particulate layer of titanium dioxide (15 microns thick) photosensitized by Ru-based dye. Formation (by screen-printing followed by firing) and photosensitization of the nano-particulate layer of titanium dioxide was performed in accordance with standard procedures well known in the prior art. The PPC were interconnected by interconnecting material 9 that comprises W particles embedded into silicone based matrix and filled by redox electrolyte 10 through small filling holes in the shared substrate (not shown). External negative and positive terminals 8 are created by application of Ag bus-bars.

Figure 3:
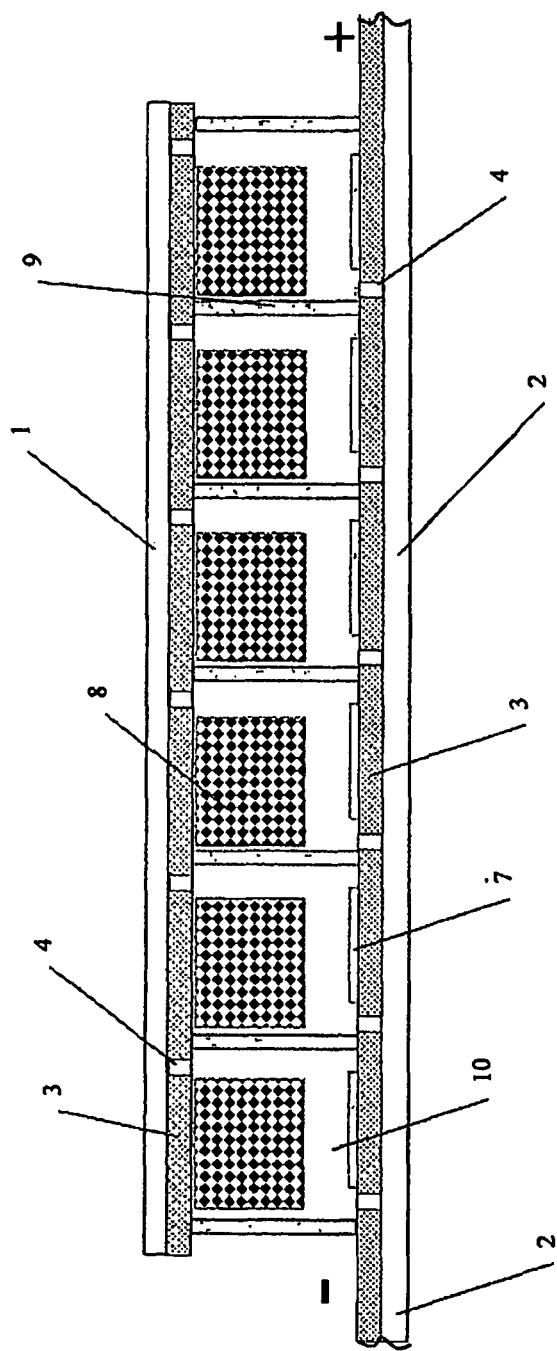
FIG. 3 is an enlarged partial cross-sectional view of a PPP formed in accordance with the second example of the invention.

With reference to FIG. 3, cross-sectional representation of the second example depicts only one individual substrate 1. All the numbered elements in this figure are as per FIG. 1 and FIG. 2. This example is different from the first example of the invention in that the photosensitized electrodes here are formed on the individual substrates and counter electrodes—on the common substrate.

Figure 4:
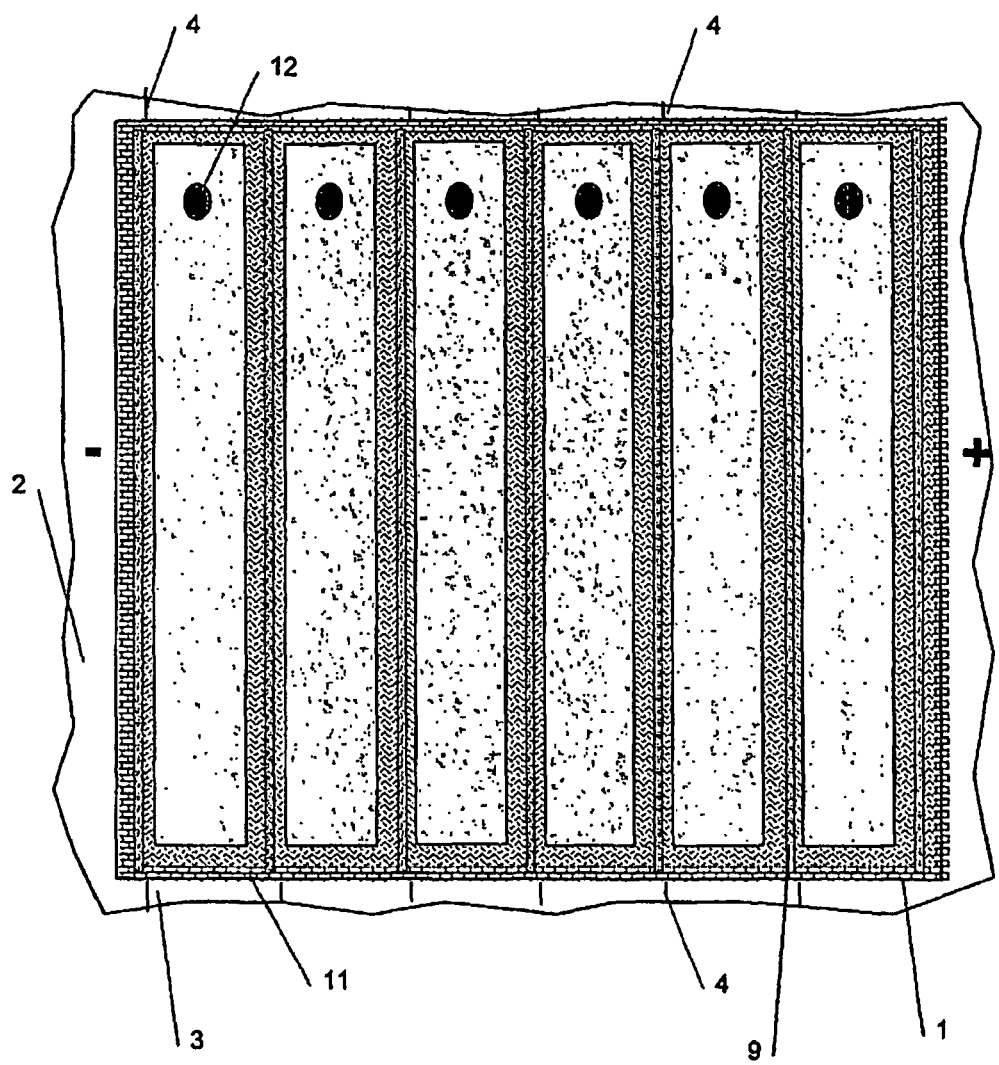
FIG. 4 is a partial plan representation of a PPP formed in accordance with the second example of the invention.

With reference to FIG. 4 a partial planar view of a PPP depicting only 1 individual substrate is presented. Additionally, sealing material 11 and filling holes 12 are shown. The holes were used for vacuum back filling of the cells with an electrolyte.

Figure 5:
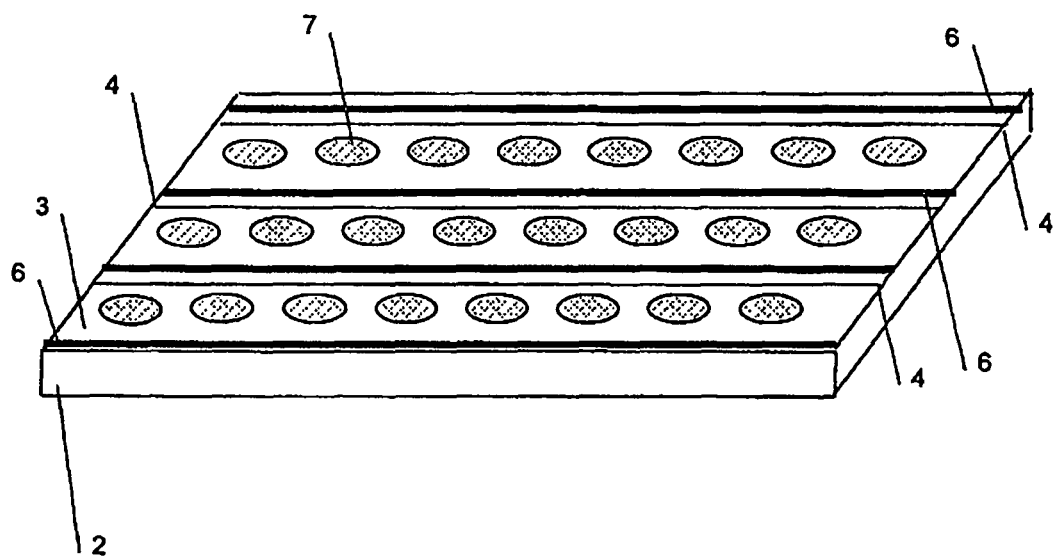
FIG. 5 is a 3D diagrammatic representation of the flexible shared substrate of PPP formed in accordance with the third example of the invention.

With reference to FIG. 5 a shared flexible substrate 2 is prepared in accordance with third example of the invention. The substrate comprises plastic sheet coated by transparent electronic conductor 3. The transparent electronic conductor 3 is divided into four-electrically isolated regions by the isolation lines 4. To enhance electrical conduction of TEC material and to provide for electrical connection four Ag bus-bars 6 are deposited onto the TEC as shown in the figure. On parts of three (out of four) isolated regions of the shared substrate the circularly shaped counter electrodes 7 are formed such as 8 equally spaced counter electrodes belong to each of the three isolated regions. This will provide for 8 PPC in each isolated region of the shared substrate that will be connected in parallel. Three groups of 8 PPC will be connected in series as further demonstrated in FIG. 6.

Figure 6:
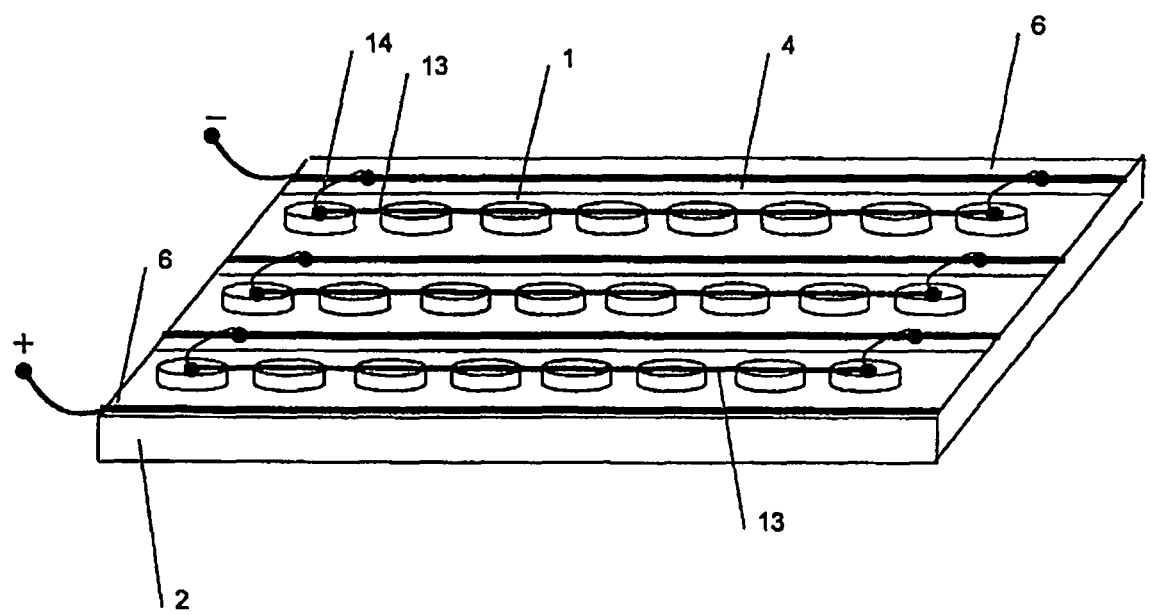
FIG. 6 is a 3D diagrammatic representation of the flexible PPP formed in accordance with the third example of the invention.

With reference to FIG. 6 a flexible PPP is prepared in accordance with the third example of the invention. The patent utilizes pre-prepared shared substrate (shown in details in FIG. 5) and 24 individual substrates 1. Each individual substrate comprises Ti foil, on which a photosensitized electrode is formed. The individual substrates sealed with the shared substrate in such a way that the photosensitive electrodes of the individual substrates oppose counter electrodes of the shared substrates. The 24 PPC are formed by filling spaces between the photosensitized electrodes and opposing counter electrodes with a redox electrolyte. The cells are connected in parallel in groups of three by external electrical connectors 13 and in series (in groups of 3) by electrical jumps 14. The positive and negative electrical terminal of the PPP are also shown.

The invention claimed is:

1. A photoelectrochemical photovoltaic panel comprising a number of individual substrates and a shared substrate, wherein
    the individual substrates and the shared substrate are electrical conductors or at least partially coated by an electrically conducting material;
    at least one the individual substrates and the shared substrate is substantially transparent to at least a part of solar radiation (optically transparent);
    at least two of the individual substrates are provided on a common surface of the shared substrate;
    photoelectrochemical photovoltaic cells, each comprising a photosensitive electrode, a counter electrode and an electrolyte dispensed between the photosensitive electrode and the counter electrode are formed between the shared substrate and the individual substrates; and
    at least one of the photoelectrochemical photovoltaic cells associated with each individual substrate is electrically connected to another photovoltaic cell associated with another individual substrate by way of the shared substrate, or by way of the electrically conductive material with which the shared substrate is coated and the individual substrate has a surface that is exposed and forms an exterior of the cell;
    wherein the at least one of the photoelectrochemical photovoltaic cells associated with each individual substrate is individually sealed.

2. The photoelectrochemical photovoltaic panel according to claim 1, wherein at least one of the individual substrates and the shared substrate comprises optically transparent material coated by a transparent electrical conductor.

3. The photoelectrochemical photovoltaic panel according to claim 2, wherein the optically transparent material comprises glass or plastic.

4. The photoelectrochemical photovoltaic panel according to claim 2, wherein the transparent electrical conductor comprises at least one of fluorine doped tin oxide, indium tin oxide or metallic mesh.

5. The photoelectrochemical photovoltaic panel according to claim 1, wherein all of the individual substrates and the shared substrate are optically transparent.

6. The photoelectrochemical photovoltaic panel according to claim 1, wherein the shared substrate comprises one of a metal sheet and a foil and all the individual substrates are optically transparent.

7. The photoelectrochemical photovoltaic panel according to claim 1, wherein the individual substrates comprise one of a metal sheet and a foil and the shared substrate is optically transparent.

8. The photoelectrochemical photovoltaic panel according to claim 1, wherein said photosensitive electrode comprises a nano-particulate wide band semiconductor, photosensitized by a thin layer of dye and electrically connected to one of one of the individual substrates and the shared substrate or its electrically conducting material.

9. The photoelectrochemical photovoltaic panel according to claim 1, wherein the photosensitive electrodes of photoelectrochemical photovoltaic cells are supported by the shared substrate.

10. The photoelectrochemical photovoltaic panel according to claim 1, wherein at least a part of the photosensitive electrodes of the photoelectrochemical photovoltaic cells are supported by the shared substrate and the photosensitive electrodes of the remaining photoelectrochemical photovoltaic cells are supported by the individual substrates.

11. The photoelectrochemical photovoltaic panel according to claim 1, wherein the shared substrate has a rectangular shape.

12. The photoelectrochemical photovoltaic panel according to claim 1, wherein the individual substrates have one of a rectangular and circular shape.

13. The photoelectrochemical photovoltaic panel according to claim 1, wherein the shared substrate is divided into electrically isolated regions, each isolated region opposes at least one adjacent individual substrate and the photoelectrochemical photovoltaic cells are formed between the individual substrate and the opposing isolated region of the shared substrate.

14. The photoelectrochemical photovoltaic panel according to claim 4, wherein the shared substrate is made of polymeric material coated by the transparent electrical conductor and all the individual substrates comprise a metallic foil, and the photosensitive electrodes of the photoelectrochemical photovoltaic cells are formed on the individual substrates and counter electrodes—on the parts of the electrically isolated regions of the shared substrate.

15. The photoelectrochemical photovoltaic panel according to claim 14, wherein the individual substrates are electrically connected to selected electrically isolated regions of the common substrate.

16. The photoelectrochemical photovoltaic panel according to claim 2, wherein electrical conductance of transparent electrical conductor material is enhanced by application of a pattern of second electrically conductive material.

17. The photoelectrochemical photovoltaic panel according to claim 16, wherein the pattern of the second conducting material comprises metallic tracks formed on transparent electrical conductor layer.

18. The photoelectrochemical photovoltaic panel according to claim 17, wherein the metallic tracks are protected by an impermeable protective layer of glazing.

19. The photoelectrochemical photovoltaic panel according to claim 16, wherein the substrate is coated where high optical transmittance is required (under or opposite the photosensitive electrodes) by a relatively thin transparent electrical conductor (the first electrically conductive material), whereas other regions of the substrates, where high electrical conductance is required, are coated by a thick transparent electrical conductor (the second electrically conductive material).

20. The photoelectrochemical photovoltaic panel according to claim 13, wherein small holes are prepared in at least one of the individual substrate and the shared substrate; the holes are used for filling the photoelectrochemical photovoltaic cells with the electrolyte.

21. The photoelectrochemical photovoltaic panel according to claim 20, wherein after filling the photoelectrochemical photovoltaic cells with the electrolyte, the holes are sealed by a polymeric material.

22. The photoelectrochemical photovoltaic panel according to claim 21, wherein the polymeric material comprises hot melt material laminated with a metallic foil.

23. The photoelectrochemical photovoltaic panel according to claim 13, wherein spaces that formed between the individual substrates when they are attached to the shared substrate are sealed with a hermetic sealant.

24. The photoelectrochemical photovoltaic panel according to claim 23, wherein the spaced are filled with a humidity absorbing material.

25. A photoelectrochemical photovoltaic panel comprising a number of individual substrates and a shared substrate, wherein
    the individual substrates and the shared substrate are electrical conductors or at least partially coated by an electrically conducting material;
    at least one the individual substrates and the shared substrate is substantially transparent to at least a part of solar radiation;
    at least two of the individual substrates are provided on a common surface of the shared substrate;
    photoelectrochemical photovoltaic cells, each comprising a photosensitive electrode, a counter electrode and an electrolyte dispensed between the photosensitive electrode and the counter electrode are formed between the shared substrate and the individual substrates;
    at least one of the photoelectrochemical photovoltaic cells associated with each individual substrate is electrically connected to another photovoltaic cell associated with another individual substrate by way of the shared substrate, or by way of the electrically conductive material with which the shared substrate is coated;
    the individual substrate has a first surface that supports a one of a foil and a transparent electrical conductor and an opposite second surface that is exposed and forms an exterior of the cell; and
    both the individual and the shared substrates comprise of one of glass and plastic;
    wherein the at least one of the photoelectrochemical photovoltaic cells associated with each individual substrate is individually sealed.

* * * * *

UNITED STATES PATENT AND TRADEMARK OFFICE
CERTIFICATE OF CORRECTION

PATENT NO. : 8,415,553 B2
APPLICATION NO. : 11/659766
DATED : April 9, 2013
INVENTOR(S) : Igor Lvovich Skryabin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 234 days.

Signed and Sealed this
Second Day of July, 2013

Teresa Stanek Rea
*Acting Director of the United States Patent and Trademark Office*